(12) United States Patent
Flandrinck

(10) Patent No.: US 10,953,863 B2
(45) Date of Patent: Mar. 23, 2021

(54) VALVE ASSEMBLY AND SYSTEM INCLUDING SAME FOR CONTROLLING FLUID FLOW TO AND FROM A CLUTCH

(71) Applicant: BorgWarner Inc., Auburn Hills, MI (US)

(72) Inventor: Christian Flandrinck, Favars (FR)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 17/007,315

(22) Filed: Aug. 31, 2020

(65) Prior Publication Data

US 2020/0398809 A1 Dec. 24, 2020

Related U.S. Application Data

(63) Continuation of application No. 15/631,071, filed on Jun. 23, 2017, now Pat. No. 10,793,133.

(Continued)

(51) Int. Cl.
*F16H 61/64* (2006.01)
*B60W 10/02* (2006.01)
(Continued)

(52) U.S. Cl.
CPC ....... *B60W 10/023* (2013.01); *F16H 61/0267* (2013.01); *F16H 61/64* (2013.01);
(Continued)

(58) Field of Classification Search
CPC .................. B60W 10/023; F16D 25/14; F16D 2025/081; F16D 2500/1027;
(Continued)

(56) References Cited

U.S. PATENT DOCUMENTS 4,133,349 A 1/1979 Stripling
4,674,613 A 6/1987 Sikorski
(Continued)

FOREIGN PATENT DOCUMENTS

CN 101173645 A 5/2008
CN 102301167 A 12/2011
(Continued)

OTHER PUBLICATIONS

Imagine SA, "BAF 13-Leakage and Viscous Friction With Variable Length and Eccentricity", 1998-2005, 3 pages.
(Continued)

*Primary Examiner* — Roger L Pang
(74) *Attorney, Agent, or Firm* — Howard & Howard Attorneys PLLC

(57) ABSTRACT

A system for controlling fluid flow to and from a clutch includes a motor, a pump, and a valve assembly, which includes a housing defining an interior and a first orifice operably coupled to the pump, a second orifice operably coupled to the clutch, and a third orifice fluidly coupled to one of said first and second orifices. A piston is operably coupled to the motor, is disposed within the interior, is movable between a first position for allowing a fluid flow between the first and second orifices, a second position for obstructing the fluid flow between the first and second orifices, and a third position for limiting the fluid flow between the first and second orifices. A biasing member is coupled to the piston, and biases the piston toward the first position when the motor is off. When the pump is activated and a pressure proximate the first orifice is equal to a pressure proximate the second orifice, the motor is energized and moves the piston to the second position. When pressure proximate the second orifice exceeds a predetermined threshold pressure, the energized motor is turned off and the (Continued)

biasing member moves the piston to the first position, or power in the energized motor is reduced and the piston moves to the third position.

20 Claims, 3 Drawing Sheets

Related U.S. Application Data

(60) Provisional application No. 62/357,577, filed on Jul. 1, 2016.

(51) Int. Cl.
| | |
|---|---|
| *F16K 31/122* | (2006.01) |
| *F16K 3/24* | (2006.01) |
| *F16K 31/06* | (2006.01) |
| *F16H 61/02* | (2006.01) |
| *F16D 25/08* | (2006.01) |
| *F16D 48/02* | (2006.01) |
| *F16K 31/124* | (2006.01) |
| *F16H 59/08* | (2006.01) |

(52) U.S. Cl.
CPC ............ *F16K 3/246* (2013.01); *F16K 31/061* (2013.01); *F16K 31/1221* (2013.01); *F16K 31/1223* (2013.01); *F16D 25/14* (2013.01); *F16D 2025/081* (2013.01); *F16D 2500/1027* (2013.01); *F16D 2500/30805* (2013.01); *F16H 2059/082* (2013.01); *F16H 2061/0279* (2013.01); *F16K 31/124* (2013.01)

(58) Field of Classification Search
CPC ....... F16D 2500/30805; F16H 61/0267; F16H 61/64; F16H 2061/0279; F16K 31/124; F16K 31/1221; F16K 3/246; F16K 31/061; F16K 31/1223
USPC .................. 137/565.16, 878, 879, 881, 882
See application file for complete search history.

(56) References Cited

U.S. PATENT DOCUMENTS

| | | | |
|---|---|---|---|
| 5,060,776 A | 10/1991 | Skog et al. | |
| 5,878,782 A | 3/1999 | Nakajima | |
| 6,540,057 B2 | 4/2003 | Konrad et al. | |
| 6,652,041 B2 | 11/2003 | Nishikimi et al. | |
| 6,848,557 B2 | 2/2005 | Kapaan et al. | |
| 6,907,901 B2 | 6/2005 | Holmes et al. | |
| 7,077,256 B2 | 7/2006 | Gratzer et al. | |
| 7,097,019 B2 | 8/2006 | Ronk et al. | |
| 7,131,410 B2 | 11/2006 | Kondo et al. | |
| 7,373,908 B2 | 5/2008 | Rizoulis et al. | |
| 7,588,133 B2 | 9/2009 | Ronk et al. | |
| 7,736,270 B2 | 6/2010 | Gierer et al. | |
| 7,898,121 B2 | 3/2011 | Ramsay et al. | |
| 8,795,119 B2 | 8/2014 | Otanez et al. | |
| 8,831,848 B2 | 9/2014 | Lang et al. | |
| 10,487,890 B2 | 11/2019 | Downs et al. | |
| 10,793,133 B2 | 10/2020 | Flandrinck | |
| 2007/0158606 A1 | 7/2007 | Oishi | |
| 2007/0209723 A1 | 9/2007 | Burrola et al. | |
| 2010/0298094 A1 | 11/2010 | Oda et al. | |
| 2011/0101772 A1* | 5/2011 | Schepp ............... F16K 31/1223 303/10 |
| 2012/0326062 A1 | 12/2012 | Wieland et al. | |
| 2013/0233396 A1 | 9/2013 | Lee et al. | |
| 2013/0281253 A1 | 10/2013 | Ross et al. | |
| 2016/0116004 A1 | 4/2016 | Ikeda | |
| 2016/0123461 A1 | 5/2016 | Eber et al. | |
| 2017/0130745 A1 | 5/2017 | Barber | |

FOREIGN PATENT DOCUMENTS

| | | |
|---|---|---|
| CN | 203730734 U | 7/2014 |
| CN | 105526278 A | 4/2016 |
| EP | 2101074 A2 | 9/2009 |
| EP | 2995833 A1 | 3/2016 |
| JP | H10292872 A | 11/1998 |
| WO | 2011090256 A1 | 7/2011 |
| WO | 2015143957 A1 | 10/2015 |

OTHER PUBLICATIONS

Wikipedia, "Hydraulic Clearance", Dec. 30, 2019, 1 page.
English language abstract and machine-assisted English translation for CN 203730734 extracted from espacenet.com database on Dec. 9, 2019, 5 pages.
English language abstract for CN 101173645 extracted from espacenet.com database on Dec. 9, 2019, 1 page.
English language abstract for CN 102301167 extracted from espacenet.com database on Dec. 9, 2019, 2 pages.
English language abstract for CN 105526278 extracted from espacenet.com database on Dec. 9, 2019, 2 pages.
English language abstract and machine-assisted English translation for WO 2015/143957 extracted from espacenet.com database on Jan. 3, 2018, 23 pages.
English language abstract and machine-assisted English translation for JPH 10-292872 extracted from espacenet.com database on Oct. 12, 2020, 8 pages.

* cited by examiner

VALVE ASSEMBLY AND SYSTEM INCLUDING SAME FOR CONTROLLING FLUID FLOW TO AND FROM A CLUTCH

RELATED APPLICATIONS

This application is a continuation of U.S. patent application Ser. No. 15/631,071, filed on Jun. 23, 2017, which claims priority to and all the benefits of U.S. Provisional Patent Application No. 62/357,577, filed on Jul. 1, 2016, the entire contents of which are hereby incorporated herein by reference.

BACKGROUND OF THE INVENTION

1. Field of the Invention

The subject invention generally relates to a system including a valve assembly for controlling fluid flow to and from a clutch.

2. Description of the Related Art

Conventional vehicle powertrain systems known in the art typically include an engine in rotational communication with a transmission. The engine generates rotational torque which is selectively translated to the transmission which, in turn, translates rotational torque to one or more wheels of a vehicle. Typical transmissions are shifted in discrete steps between a high-torque, low-speed mode for starting the engine and a high-speed, low-torque mode for vehicle operation at highway speeds. In a manual transmission, shifting is accomplished by the manual controlled engagement of gear sets. In an automatic transmission, shifting is accomplished by the automatic controlled engagement of friction elements.

Generally, in transmissions, clutches are used to engage and disengage various components of the transmission. In manual transmissions, the clutch selectively transmits rotational movement from a crankshaft of the engine to the manual transmission. In automatic transmissions, the clutch may be used in a torque converter or other components to control automatic shifting of gears.

Systems have been used to control fluid flow to and from the clutch. Typically, the system includes a motor, a pump for actuating the fluid flow to and from the clutch, and a valve assembly for regulating fluid flow to and from the clutch. The valve assembly has a housing defining an interior. Traditionally, the housing defines a first orifice operably coupled to the pump and a second orifice operably coupled to the clutch. The valve assembly also includes a piston disposed within the interior of the housing. However, traditional systems only have a piston moveable between a first position for obstructing fluid flow from the pump to the clutch, and a second position for allowing fluid flow from the pump to the clutch. In such traditional systems, the piston of the valve assembly only accounts for obstructing fluid flow from the pump to the clutch, and for allowing fluid flow from the pump to the clutch. Such traditional systems may cause an overshoot or undershoot of a pressure within the clutch. As such, there remains a need to provide for an improved valve assembly and system for controlling fluid flow to and from the clutch.

SUMMARY OF THE INVENTION AND ADVANTAGES

A system for controlling fluid flow to and from a clutch includes a motor, a pump configured to actuate the fluid flow to and from the clutch, and a valve assembly operably coupled to the motor and to the pump. The valve assembly includes a housing defining an interior. The housing defines a first orifice operably coupled to the pump, a second orifice operably coupled to the clutch, and a third orifice fluidly coupled to at least one of said first orifice and said second orifice. A piston is operably coupled to the motor and is disposed within the interior of the housing. The piston is movable between a first position for allowing a fluid flow between the first orifice and the second orifice, a second position for obstructing the fluid flow between the first orifice and the second orifice, and a third position for limiting the fluid flow between the first orifice and the second orifice. A biasing member is coupled to the piston, with the biasing member biasing the piston toward the first position when the motor is off. When the pump is activated and a pressure proximate the first orifice is equal to a pressure proximate the second orifice, the motor is energized and moves the piston to the second position. When pressure proximate the second orifice exceeds a predetermined threshold pressure, the energized motor is turned off and the biasing member moves the piston to the first position, or power in the energized motor is reduced and the piston moves to the third position.

One embodiment is directed toward a method for controlling fluid flow to and from a clutch. The method includes the step of biasing a piston disposed within a housing towards a first position to allow the fluid flow between a first orifice and a second orifice when a motor is off, with the first orifice, the second orifice and the third orifice being defined in the housing. The third orifice is fluidly coupled to at least one of the first orifice and the second orifice. The first orifice is operably coupled to a pump. The second orifice is operably coupled to the clutch. The method also includes the steps of activating the pump and energizing the motor when a pressure proximate the first orifice is equal to a pressure proximate the second orifice, wherein the energized motor moves the piston away from the motor and into a second position for obstructing the fluid flow between the first orifice and the second orifice. The method also includes the step of moving the piston into a third position for limiting the fluid flow between the first orifice and the second orifice by reducing power to the energized motor, or moving the piston into the first position by turning off the energized motor, when the pressure proximate the second orifice exceeds a predetermined threshold pressure.

Accordingly, the piston is moveable into a third position for limiting the fluid flow between the first orifice and the second orifice. The piston being moveable into the third position for limiting the fluid flow between the first orifice and the second orifice helps prevent overshooting or undershooting of a pressure of the clutch. Furthermore, the method for controlling the fluid flow to and from a clutch allows the piston to limit the fluid flow between the first orifice and the second orifice, which also helps prevent overshooting or undershooting of a pressure of the clutch.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 5:
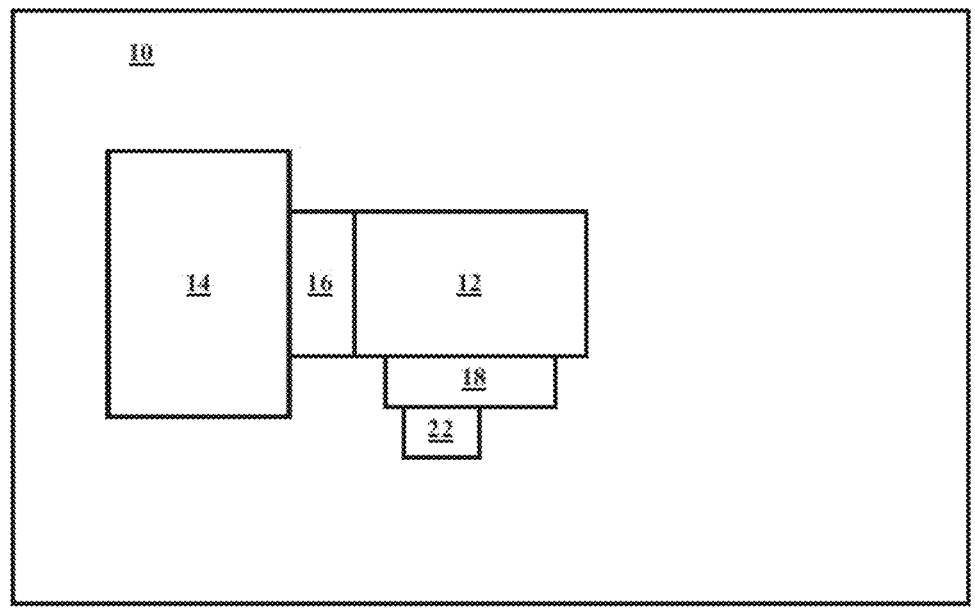
FIG. 5 is a schematic view of a vehicle including a transmission, an engine, a clutch, a valve body, and a pump.

With reference to the Figures, wherein like numerals indicate like parts throughout the several views, a vehicle 10 including a transmission 12 is shown in FIG. 5. The vehicle 10 also includes an engine 14 for providing rotational motion to be transferred to the transmission 12. In one embodiment, the transmission 12 is an automatic transmission. In another embodiment, the transmission 12 is a manual transmission. It is to be appreciated that the vehicle 10 may be a car or a truck, and that the vehicle 10 may have the automatic transmission or the manual transmission. The transmission 12 includes at least one clutch 16 for transmitting rotational motion to the transmission 12. For ease of reading throughout the specification, the at least one clutch 16 will be referred to as the clutch 16. It is to be appreciated that the transmission 12 may include more than one clutch 16.

The vehicle 10 includes a valve body 18 defining a hydraulic circuit. The hydraulic circuit helps direct the flow of fluid to the transmission 12 and, specifically, to the clutch 16. The hydraulic circuit may also help direct the flow of fluid to other components of the transmission 12, such as torque converters and servo bands.

The vehicle 10 also includes a system 20, as shown in FIGS. 1-4, for controlling fluid flow to and from the clutch 16. The system 20 includes a pump 22 coupled to the valve body 18. The pump 22 is configured to actuate the fluid flow from the hydraulic circuit to the clutch 16. One having ordinary skill in the art will appreciated that the pump 22 may be any suitable pump for actuating the fluid flow from the hydraulic circuit to the clutch 16, such as a centrifugal pump or a positive displacement pump. The system 20 also includes a motor 24. Typically, the motor 24 is a magnetic motor, however it is contemplated that the motor 24 may be any type of motor as known by one of ordinary skill in the art. The use of the motor 24 is described in further detail below.

The system 20 additionally includes a valve assembly 26 operably coupled to the motor 24 and to the pump 22, as best shown in FIGS. 1-4. The valve assembly 26 may be disposed within the valve body 18 or in other locations such as the hydraulic circuit or locations as known by one of ordinary skill in the art. The valve assembly 26 helps to regulate the flow of fluid to the transmission 12. Specifically, the valve assembly 26 regulates the amount of fluid flowing from the pump 22 to the clutch 16 or other components of the transmission 12.

In one embodiment, the valve assembly 26 is used in a manual transmission. In manual transmissions, the clutch 16 is actuated by a driver pushing down on a pedal, with the pedal and the clutch 16 being mechanically coupled to one another. In such embodiments, the valve assembly 26 regulates fluid flow to the clutch 16 of the manual transmission, as described in further detail below.

In standard manual transmissions, having the clutch 16 mechanically coupled to the pedal controlled by the driver causes problems. For example, having the clutch 16 mechanically coupled to the pedal can become tedious to the driver in many stop-and-go settings. Additionally, having the clutch 16 mechanically coupled to the pedal can cause stalling of the engine 14 due to errors in shifting by the driver or sudden braking, etc. Recently, vehicles have been using clutches for manual transmissions referred to as a clutch-by-wire system, which has the clutch 16 electrically coupled to the pedal, rather than mechanically coupled to the pedal. In clutch-by-wire systems, the clutch 16 is electronically controlled to account for various situations, such as to prevent stalling from sudden braking, and to assist the driver in tedious situations such as stop-and-go traffic. Typically, the vehicle 10 includes a sensor for sensing the engine rotation, gear selection, and fluid flow, such that the pump 22 and valve assembly 26 provide the appropriate amount of fluid flow to the clutch 16.

In such clutch-by-wire systems, the valve assembly 26 controls the flow of fluid between the pump 22 and the clutch 16 depending on various conditions, as mentioned above, such as engine rotation, gear selection, and fluid flow. Operation of the valve assembly 26 in relation to the clutch-by-wire system is described in further detail below.

As illustrated in the Figures, the valve assembly 26 includes a housing 28. The housing 28 is generally comprised of a metal material, typically steel or a steel alloy, but it is contemplated that the housing 28 may be comprised of any other metal material, a plastic, or another material as desired by one of ordinary skill in the art. As illustrated in the embodiment shown in FIGS. 1-4, the housing 28 includes a side wall 30 and an end wall 32. Additionally, the housing 28 may have first portion 34 and a second portion 36. It is contemplated that the first portion 34 and the second portion 36 may be formed as a single piece such that there are no gaps or seams between the first portion 34 and the second portion 36. The first portion 34 has a generally rectangular cross-section such that the end wall 32 is disposed perpendicular to the side wall 30. As illustrated in the embodiment shown in FIGS. 1-4, the second portion 36 may be generally cone-shaped. In other words, the side wall 30 tapers inwards towards itself at the second portion 36. As such, a width of the second portion 36 of the housing 28 may be less than a width of the first portion 34 of the housing 28. Moreover, the housing 28 defines an interior 38. As illustrated in the embodiment shown in FIGS. 1-4, the interior 38 is defined by the side wall 30 and the end wall 32.

Additionally, at least a first orifice 40 and a second orifice 42 are defined in the housing 28. The first orifice 40 and the second orifice 42 are disposed completely through the housing 28 such that fluid may flow from outside the housing 28 to the interior 38 of the housing 28 and vice versa. The first orifice 40 and the second orifice 42 are fluidly coupled such that fluid may flow back and forth between the first orifice 40 and the second orifice 42. As illustrated in the embodiment shown in FIGS. 1-4, the first orifice 40 may be defined in the second portion 36 of the housing 28 such that the tapered portion of the side wall 30 ends at a distance spaced apart from itself defining the first orifice 40. It is also contemplated that the first orifice 40 may be disposed at another location in the housing 28 including, but not limited to, defined in the side wall 30 in either the first portion 34 or the second portion 36 of the housing 28. As additionally illustrated in the embodiment shown in FIGS. 1-4, the second orifice 42 may be defined in the side wall 30 in the first portion 34 of the housing 28. It is also contemplated that the second orifice 42 may be disposed at another location in the housing 28 including but not limited to defined in the side wall 30 in the second portion 36 of the housing 28 or in the first portion 34 of the housing 28.

It is contemplated that the first orifice 40 may be operably or fluidly coupled to the pump 22 such that the pump 22 may influence a fluid pressure proximate the first orifice 40. Additionally, a fluid pressure in the pump 22 may be equal to the pressure proximate the first orifice 40 or may be different from the pressure proximate the first orifice 40 due to distance of the pump 22 from the first orifice 40 or various other factors. Moreover, it is contemplated that the second orifice 42 may be operably or fluidly coupled to the clutch 16 such that the clutch 16 may influence a fluid pressure proximate the second orifice 42. Additionally, a pressure in the clutch 16 may be equal to the pressure proximate the second orifice 42 or may be somewhat different from the pressure proximate the second orifice 42 due to distance of the clutch 16 from the second orifice 42 or various other factors.

It is also contemplated that a third orifice 44 may be defined in the housing 28. The third orifice 44 may be fluidly coupled to at least one of the second orifice 42 and the first orifice 40. As illustrated in the embodiment shown in FIGS. 1-4, the third orifice 44 may be disposed adjacent to the second orifice 42 and defined in the side wall 30 in the first portion 34 of the housing 28. Moreover, the third orifice 44 may be proximate the end wall 32. It is also contemplated that the third orifice 44 may be defined in the housing 28 at any other location including but not limited to defined in the side wall 30 in the second portion 36 of the housing 28, or defined in the end wall 32 of the housing 28.

As illustrated in the embodiment shown in FIGS. 1-4, the third orifice 44 may also be operably or fluidly coupled to the clutch 16 such that the clutch 16 may influence a fluid pressure proximate the third orifice 44. Additionally, the pressure in the clutch 16 may be equal to the fluid pressure proximate the third orifice 44 or may be somewhat different from the fluid pressure proximate the third orifice 44 due to distance of the clutch 16 from the third orifice 44 or various other factors. Moreover, it is contemplated that the fluid pressure proximate the second orifice 42 and the pressure proximate the third orifice 44 may be identical or similar.

Referring still to the embodiment illustrated in FIGS. 1-4, a fourth orifice 46 may additionally be defined in the housing 28. The motor 24 may also include a motor pin 48. The fourth orifice 46 may be defined by the end wall 32 and configured to allow the motor pin 48 of the motor 24 to engage the interior 38 of the housing 28. As illustrated in the embodiment shown, the fourth orifice 46 may be centrally located along the end wall 32. However, it is contemplated that the fourth orifice 46 may be disposed in any portion of the end wall 32 including but not limited to proximate the side wall 30. Moreover, it is additionally contemplated that the fourth orifice 46 may be disposed in any portion of the housing 28 and configured to allow the motor pin 48 to engage the interior 38 of the housing 28 including but not limited to defined in side wall 30 on the first 34 or second portions 36 of the housing 28. Alternatively, it is contemplated that the motor 24 or motor pin 48 may be operably coupled to the valve assembly 26 without being disposed through the fourth orifice 46. In this case, there would not be a fourth orifice 46 disposed in the end wall 32 and the end wall 32 would be continuous about the circumference of the side wall 30. It is to be appreciated that the motor 24 may be any motor for actuating a piston 54 within the interior 38 of the housing 28. In some embodiments, the motor 24 may include a coil disposed about or disposed within the housing 28 for providing a magnetic field upon energization of the coil for moving the piston 54.

The housing 28 may also define a protrusion or detent 50, as illustrated in the embodiment shown in FIGS. 1-4. It is additionally contemplated that the housing 28 may define a plurality of detents. The detent 50 may extend from the sidewall into the interior 38 of the housing 28. More specifically, the detent 50 extends from the tapered portion of the side wall 30 of the second portion 36 of the housing 28 into the interior 38 of the housing 28. In the embodiment illustrated in FIGS. 1-4, the detent 50 is triangularly shaped such that the detent 50 has a generally flat wall 52 which extends generally perpendicular from the side wall 30. The flat wall 52 is configured to act as a shelf-like member and, when present, the flat wall 52 may be engaged a biasing member 53, as described in further detail below. It is also contemplated that the detent 50 may be of any shape as desired by one of ordinary skill in the art in order to engage the biasing member 53.

As illustrated in FIGS. 1-4, the piston 54 is disposed within the interior 38 of the housing 28. Additionally, the piston 54 is operably coupled to the motor 24. The piston 54 may be comprised of a metal material such as steel or a steel alloy, or may be comprised of another material as known by one of ordinary skill in the art including but not limited to aluminum or an aluminum alloy. As illustrated in the embodiment shown in FIGS. 1-4, the piston 54 may be a poppet. More specifically, the piston 54 includes a first segment 56 which has a generally rectangular cross-section. Additionally or alternatively, in one or more positions of the piston 54, the first segment 56 may be of the size and shape to be seated within the first portion 34 of the housing 28. In other words, in one or more positions of the piston 54, the first segment 56 may engage one or all of the side wall 30 or the end wall 32. The piston 54 may also include a second segment 58 having a finger-like shape. More specifically, the second segment 58 may have a first end 60 extending from the first segment 56 and a second end 62, opposite the first end 60, which is curved. The first end 60 and the second end 60 of the second segment 58 may be connected by parallel walls extending from the first end 60 to the curved end. Additionally or alternatively, when the second end 60 is curved, the second end 60 may be sized and shaped in order to engage an interior surface 64 of the tapered sections of the side wall 30 of the second portion 36 of the housing 28 in one or more positions of the piston 54. Additionally, it is contemplated that a width of the first segment 56 is greater than a width of the second segment 58. Moreover, the second segment 58 may extend from the first segment 56 at a central location of the rectangular cross section such that shelf-like indents 66 are exposed on either side of the rectangular cross section of the first segment 56. It is contemplated that the first segment 56 and the second segment 58 are simply portions of a single-pieced piston 54 such that there are no gaps or seams between the first segment 56 and the second segment 58.

The valve assembly 26 also includes the biasing member 53 coupled to the piston 54, as illustrated in the embodiment of FIGS. 1-4. Moreover, it is contemplated that the valve assembly 26 may include multiple biasing members. The biasing member 53 is typically a spring but may be any other biasing member 53 as known by one of ordinary skill in the art. Moreover, the spring may be a compression spring, an extension spring, a torsion spring, or any other spring as known by one of ordinary skill in the art. The biasing member 53 may be comprised of any material as known by one of ordinary skill in the art including but not limited to steel, a steel alloy, aluminum, an aluminum alloy, or a plastic material.

As illustrated in the embodiment shown in FIGS. 1-4, the biasing member 53 may be operably coupled to the piston 54 and is configured to bias the piston 54 in a direction within the housing 28. Additionally, the biasing member 53 may be disposed between the housing 28 and the piston 54. More specifically, the biasing member 53 may be disposed between the detent 50 of the housing 28 and the indent 66 of the first segment 56 of the piston 54. It is contemplated that the biasing member 53 may directly engage one or both of the detent 50 and the indent 66 as illustrated in the Figures, or may be operably coupled to one or both of the detent 50 and the indent 66. As shown in the embodiment illustrated in FIGS. 1-4, the biasing member 53 may be coupled to the indent 66 extending from the side wall 30 and extend proximate the side wall 30 to be coupled on an opposite end with the indent 66 of the piston 54. Alternatively, the biasing member 53 may be disposed in any orientation to be coupled between the housing 28 and the piston 54.

As illustrated in FIGS. 1-4, the piston 54 is moveable within the housing 28 between various positions. In the embodiment illustrated in the Figures, the piston 54 is movable between at least a first position, a second position, and a third position. The piston 54 may be operable coupled to and actuated by the motor 24. Moreover, the piston 54 may be moved or held in one or more of the first position, the second position, or the third position by the motor 24 and/or the biasing member 53.

Figure 1:
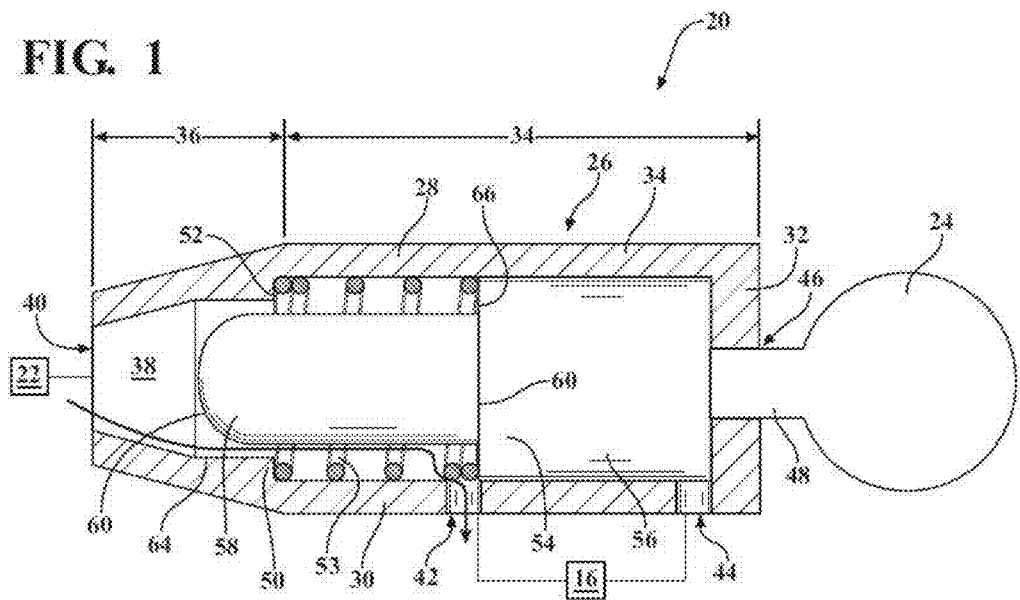
FIG. 1 is a schematic cross-sectional view of a valve assembly having a piston in a first position.
Figure 4:
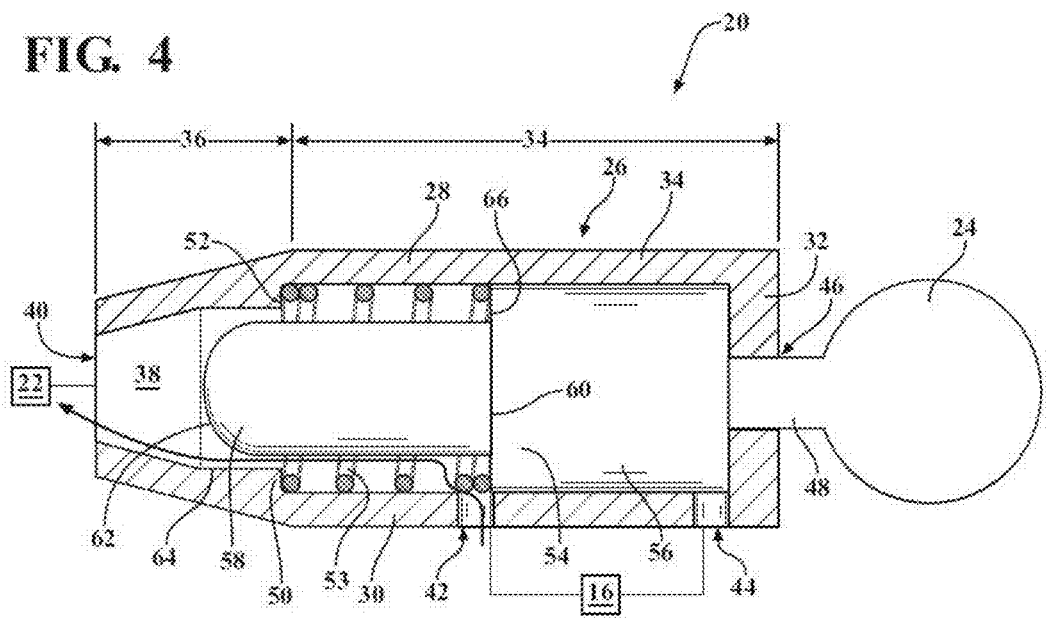
FIG. 4 is a schematic cross-sectional view of the valve assembly having the piston returned to the first position.

As illustrated in the embodiment shown in FIG. 1, the biasing member 53 biases the piston 54 in the first position. Moreover, in the first position the first segment 56 of the piston 54 is seated against the end wall 32 of the housing 28. In other words, the piston 54 is fixed in the first position. As such, when the piston 54 is in the first position, the third orifice 44 is effectively sealed off such that there is no fluid flow in or out of the third orifice 44. When the piston 54 is in the first position, the first orifice 40 is open and the second orifice 42 is open allowing fluid flow between the first orifice 40 and the second orifice 42. In other words, when the piston 54 is in the first position, the piston 54 is positioned towards the end wall 32 such that the piston 54 is away from the first orifice 40 and the second orifice 42 to allow maximum fluid flow between the first orifice 40 and the second orifice 42, in either direction. When the piston 54 is in the first position, the pump 22 and the clutch 16 are able to freely exchange fluid flow to either increase the fluid pressure within the clutch 16 or to decrease the fluid pressure within the clutch 16. As shown in FIG. 1, the fluid flows from the pump 22, through the first orifice 40, through the interior 38 of the housing 28, through the second orifice 42, and into the clutch 16. The valve assembly 26 allows the fluid flow from the pump 22 to the clutch 16 when the clutch 16 needs a higher fluid pressure. As shown in FIG. 4, the fluid flows from the clutch 16, through the second orifice 42, through the interior 38 of the housing 28, through the first orifice 40, and into the pump 22. The valve assembly 26 allows the fluid to flow from the clutch 16 to the pump 22 when the clutch 16 needs to decrease the fluid pressure.

Figure 2:
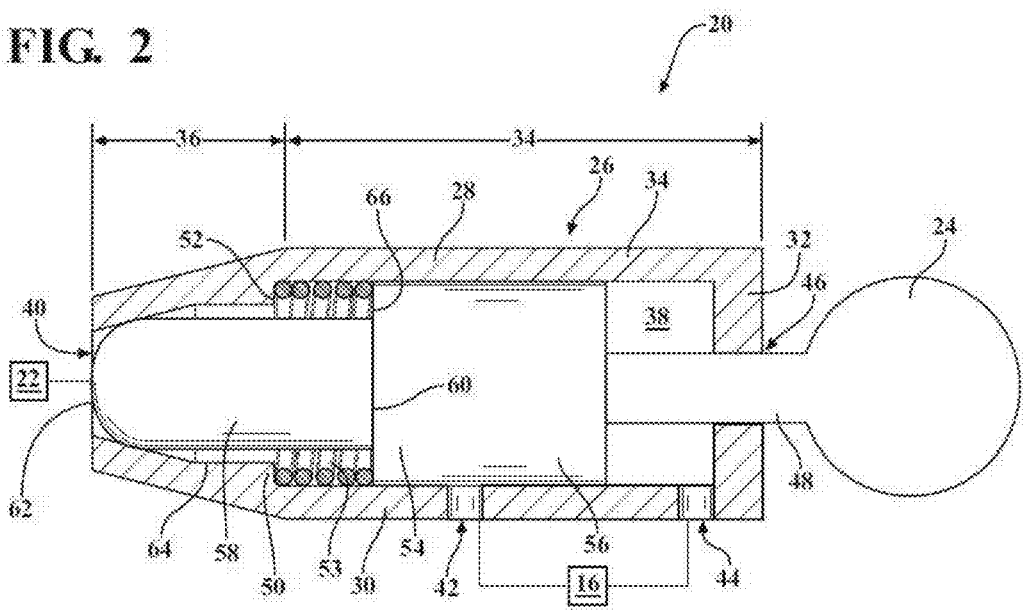
FIG. 2 is a schematic cross-sectional view of the valve assembly having the piston in a second position.

As illustrated in FIG. 2, the piston 54 is moveable to the second position. In the second position, the biasing member 53 is compressed and the piston 54 is moved towards the first orifice 40 defined in the second portion 36 of the housing 28. As such, the piston 54 is fixed within the second position. Moreover, when the piston 54 is in the second position, the first segment 56 of the piston 54 is disposed over the second orifice 42. As such, the second orifice 42 is effectively closed off when the piston 54 is in the second position such that no fluid flow occurs in or out of the second orifice 42. Additionally, when the piston 54 is in second position, the second segment 58 of the piston 54 is in contact with the interior surface 64 of the tapered side wall 30. More specifically, the curved portions on either side of a center line of the piston 54 come into contact with the interior surface 64 of the tapered portions of the side wall 30 thereby establishing a ball-to-cone type of engagement. This ball-to-cone type engagement has the advantage of effectively sealing off the first orifice 40 such that no fluid flow occurs in or out of the first orifice 40. The ball-to-cone engagement orientation of the piston 54 and the second portion 36 of the housing 28 ensures no fluid leaks from the second orifice 42 to the first orifice 40 and effectively seals the pump 22 from providing fluid flow to and from the clutch 16. Although other shapes and orientations between the housing 28 and the piston 54 have been contemplated, the ball to cone arrangement provides superior sealing to known methods such as having a completely linear housing 28 and/or having a rectangular cross section of the piston 54. When the piston 54 is in the second position, fluid is obstructed from flowing from the second orifice 42 to the first orifice 40, and, in turn, from the clutch 16 to the pump 22 or from the pump 22 to the clutch 16. Additionally, when the piston 54 is in the second position, the fluid pressure in first orifice 40 may be lowered while the piston 54 is keeping the fluid pressure in the second orifice 42.

Figure 3A:
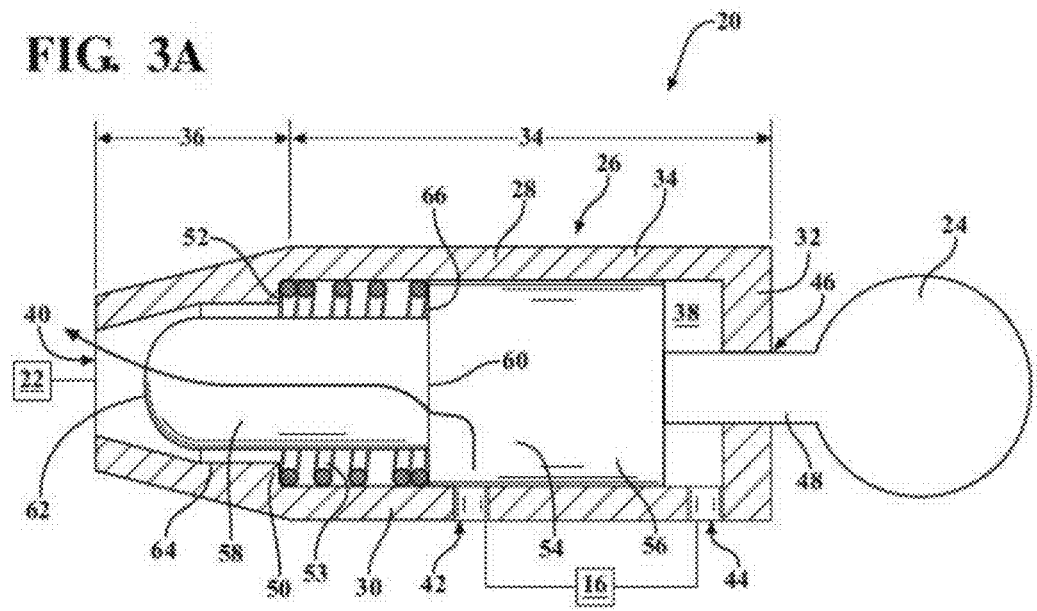
FIG. 3A is a schematic cross-sectional view of the valve assembly having the piston in a third position.
Figure 3B:
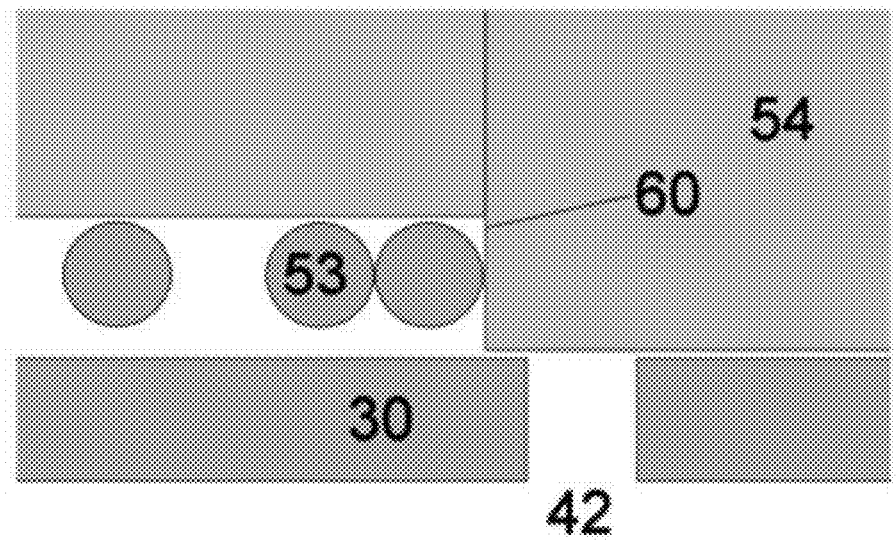
FIG. 3B is a schematic close-up of a second orifice in the schematic cross-sectional view of FIG. 3A and shows hydraulic clearance of a piston in the valve assembly.

When the piston 54 is in the third position, as illustrated in FIG. 3, the piston 54 is disposed away from both the first orifice 40 and the end wall 32 of the housing 28. As such, the location of the piston 54 in the third position is between the location of the piston 54 in the first position and the location of the piston 54 in the second position. In the third position, the piston 54 is disposed away from the first orifice 40 such that the fluid flow may occur through the first orifice 40. Moreover, the piston 54 is disposed away from the third orifice 44 such that fluid may flow into and out of the first orifice 40. Additionally, the piston 54 is disposed at least partially over the second orifice 42 which allows the fluid flow to be metered, or limited, between the first orifice 40 and the second orifice 42. In the embodiment illustrated in FIG. 3, the piston 54 is disposed over the second orifice 42 allowing very minimal or controlled fluid flow to and from the second orifice 42. However, it is also contemplated that the piston 54 may be only partially disposed over the second orifice 42 allowing slightly more fluid flow but less than the maximum fluid flow which as may occur when the piston 54 is in the first position.

Having the valve assembly 26 including the piston 54 moveable between the first, second, and third positions helps with controlling the clutch 16. In standard valve assemblies, the piston 54 is only moveable between the first position and the second position. In this instance, there is no third (or intermediate) position in which the piston 54 of the valve assembly 26 can accurately control or meter fluid flow between the pump 22 and the clutch 16. As such, the driver may feel an overshoot or undershoot of fluid pressure within the clutch 16.

In a clutch-by-wire system, as described above, the clutch 16 is electronically controlled to account for various situations, such as preventing stalling from sudden braking, and to assist the driver in tedious situations such as stop-and-go traffic. As also mentioned above, the vehicle 10 includes the sensor for sensing the engine rotation, gear selection, and fluid flow, such that the pump 22 and valve assembly 26 provide the appropriate amount of fluid flow to the clutch 16. In such clutch-by-wire systems, the valve assembly 26 controls the flow of fluid between the pump 22 and the clutch 16 depending on various conditions, as mentioned above, such as engine rotation, gear selection, and fluid flow. Previous valve assemblies only having the piston 54 moveable and fixed in the first and second positions are unable to account for a controlled fluid flow between the pump 22 and the clutch 16. As such, piston 54 being moveable into and fixed in the third position allows the valve assembly 26 to limit/meter the fluid flow between the first orifice 40 and the second orifice 42, and, in turn, between the pump 22 and the clutch 16. The piston 54 being moveable into the third position for limiting/metering the fluid flow between the first orifice 40 and the second orifice 42, and, in turn, the clutch 16 and the pump 22, helps prevent overshooting or undershooting of the fluid pressure in the clutch 16. This helps alleviate any inconvenience of feel with the clutch 16 or other undesirable effects from undershooting or overshooting the fluid pressure in the clutch 16.

As mentioned above, the valve assembly 26 may be used in traditional manual transmissions or automatic transmissions for limiting, controlling, and/or metering fluid flow between various components of the transmission by having the piston 54 moveable or fixed in the third position.

Since the piston 54 is moveable between the first, second, and third positions, the valve assembly 26 is able to account for five different modes of operation. The first mode is allowing fluid to flow freely from the first orifice 40 to the second orifice 42 when the piston 54 is in the first position, as shown in FIG. 1. In the first mode, the fluid pressure in the pump 22 is greater than the fluid pressure in the clutch 16. The second mode is obstructing fluid flow from the first orifice 40 to the second orifice 42 when the piston 54 is in the second position, as shown in FIG. 2. In the second mode, the fluid pressure in the pump 22 is equal to the fluid pressure in the clutch 16. The third mode is also obstructing fluid from flowing between the first orifice 40 and the second orifice 42, as also shown in FIG. 2. In the third mode, the fluid pressure in the pump 22 approaches 1 bar as the fluid pressure in the clutch 16 is greater than or equal to the maximum operating pressure. The fourth mode allows fluid to flow freely from the second orifice 42 to the first orifice 40 when the piston 54 is in the first position, as shown in FIG. 4. In the fourth mode, the fluid pressure in the clutch 16 is greater than the fluid pressure in the pump 22. As such, when the fluid flows from the clutch 16 and the second orifice 42 to the pump 22 and the first orifice 40, the fluid pressure in the clutch 16 goes from the maximum operating temperature to approaching 1 bar and the fluid pressure in the pump 22 increases. The fifth mode is similar to the fourth mode, except in the fifth mode the piston 54 is in the third position to limit/meter the fluid flow from the clutch 16 to the pump 22, as shown in FIG. 3. This allows for a safety function with the motor 24 being partially on. The 1 bar designation above is the pressure associated with the system illustrated in the embodiment shown in FIGS. 1-4, however, it is contemplated that other systems may operate at various pressures.

The illustrated positions throughout the Figures are exemplary only such that various other positions of the piston 54 and orientations have been contemplated for allowing various amounts of fluid flow between the various orifices.

In operation, as illustrated in FIG. 1, the piston 54 is biased by the biasing member 53 into the first position while the motor 24 turned off. When the pump 22 is activated, the pressure proximate the first orifice 40 is greater than the pressure proximate the second orifice 42 which allows the fluid to flow through the interior 38 of the housing 28 from the first orifice 40 to the second orifice 42. Once the pressure proximate the first orifice 40 is equal to the pressure proximate the second orifice 42, the motor 24 may be activated, or turned on, and the pump 22 may be turned off. The motor 24 then moves the piston 54 to the second position which effectively seals off the first orifice 40 and the second orifice 42, as illustrated in FIG. 2. Therefore, there is no fluid flow through the interior 38 of the housing 28 when the piston 54 is in the second position. While the piston 54 is in the second position, the fluid pressure proximate the first orifice 40 is allowed to approach 1 bar since the pump 22 is turned off. Alternatively, the pump 22 may remain on and the pump 22 may help reduce the fluid pressure proximate the first orifice 40 approach 1 bar. Meanwhile, the clutch 16 is operating and increasing the pressure proximate the second orifice 42. In order to prevent a possibly damaging pressure buildup in the clutch 16, when the pressure proximate the second orifice 42 meets or exceeds a threshold operating pressure (Pomax), the piston 54 needs to be moved away from the second position to allow a release of fluid pressure proximate the second orifice 42. It is contemplated that the threshold operating pressure may be measured or calculated in the clutch 16 or outside of the clutch 16 and proximate the second orifice 42. Once the pressure proximate the second orifice 42 meets or exceeds the threshold operating pressure, one of two things may occur. First, power supplied to the motor 24 may be reduced to a completely off configuration which will move the piston 54 back to the first position due to the biasing member 53. This allows the pressure proximate the second orifice 42 to be reduced quickly as the piston 54 allows full fluid flow from the second orifice 42 to the first orifice 40 in the first position. Alternatively, the motor 24 may reduce power to a lower operating voltage allowing the piston 54 to move into the third position. It is contemplated that the reduced power in this case may be approximately half the full voltage power, however, various other configurations have been contemplated without departing from the scope of the invention. As described above, when the piston 54 is in the third position the fluid flow between the second orifice 42 and the first orifice 40 is metered or limited. As such, the pressure proximate the second orifice 42 will slowly reduce towards 1 bar. Moreover, when the piston 54 is in the third position, the fluid flow slowly flows between the second orifice 42 and the first orifice 40 so a desired operating pressure of the clutch 16 will not be overshot or undershot which avoids the driver of the vehicle 10 feeling an inconvenience due to an undesirable pressure in the clutch 16.

Moreover, in an alternative embodiment, when the pressure proximate the second orifice 42 meets or exceeds to threshold operating pressure, the motor 24 may be turned off and the piston 54 may be moved into and held at the third position using an equilibrium between the fluid pressure proximate the third orifice 44 and a force of the biasing member 53. In other words, when the motor 24 is turned off, fluid flows into the third orifice 44 until a pressure inside the housing 28 proximate the third orifice 44 reaches an equilibrium with the force of the spring which holds the piston 54 in the third position. Again, when the piston 54 is in the third position, the fluid flow slowly flows between the second orifice 42 and the first orifice 40 so a desired operating pressure of the clutch 16 will not be overshot or undershot which avoids the driver of the vehicle 10 feeling an inconvenience due to an undesirable pressure in the clutch 16. The force provided by the biasing member 53 may be any suitable force to hold the piston 54 in the third position. As such, one having ordinary skill in the art will appreciate that the k-factor of the biasing member 53 may be adjusted such that an equilibrium of fluid pressure between the third orifice 44 and the biasing member 53 may be achieved.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A valve assembly operably coupled to a motor, a pump, and at least one clutch, said valve assembly comprising:
    a housing defining an interior, with said housing defining a first orifice operably coupled to the pump, a second orifice operably coupled to the at least one clutch, and a third orifice fluidly coupled to at least one of said first orifice and said second orifice;
    a piston operably coupled to the motor and disposed within said interior of said housing, with said piston movable between a first position for allowing a fluid flow between said first orifice and said second orifice, a second position for obstructing said fluid flow between said first orifice and said second orifice, and a third position for limiting said fluid flow between the first orifice and the second orifice; and
    a biasing member coupled to said piston, with said biasing member biasing said piston toward said first position when the motor is off,
    wherein when the pump is activated and a pressure proximate the first orifice is equal to a pressure proximate the second orifice, the motor is energized and moves the piston to the second position, and
    wherein when pressure proximate the second orifice exceeds a predetermined threshold pressure, the energized motor is turned off and the biasing member moves the piston to the first position, or power in the energized motor is reduced and the piston moves to the third position.

2. The valve assembly of claim 1, wherein when the piston is in the second position, the pump is turned off.

3. The valve assembly of claim 1, wherein the predetermined threshold pressure is measured or calculated in the at least one clutch, or outside of the at least one clutch and proximate the second orifice.

4. The valve assembly of claim 1, wherein when the motor is turned off and the biasing member moves the piston to the first position, pressure proximate the second orifice is reduced as fluid flows from the second orifice to the first orifice in the first position.

5. The valve assembly of claim 1, wherein when power in the motor is reduced and the piston moves to the third position, fluid flows slowly between the second orifice and the third orifice so that a desired operating pressure of the at least one clutch is not overshot or undershot.

6. The valve assembly of claim 1, wherein said housing includes at least a side wall and an end wall, wherein said third orifice is disposed adjacent to said second orifice and defined in said side wall, and wherein in said first position said piston is seated against said end wall of said housing.

7. The valve assembly of claim 1, wherein said third orifice is covered when said piston is in said first position and wherein said second orifice is covered when said piston is in said second position.

8. The valve assembly of claim 1, wherein in said second position said housing and said piston establish a ball-to-cone engagement.

9. A system for controlling fluid flow to and from at least one clutch, said system comprising:
    a motor;
    a pump configured to actuate the fluid flow to and from the at least one clutch; and
    the valve assembly of claim 1.

10. A method for controlling fluid flow to and from at least one clutch, said method comprising:
    biasing a piston disposed within a housing towards a first position to allow the fluid flow between a first orifice and a second orifice when a motor is off, the first orifice, the second orifice, and a first orifice being defined in the housing, said third orifice fluidly coupled to at least one of said first orifice and said second orifice, said first orifice operably coupled to a pump, and said second orifice operably coupled to the at least one clutch;
    activating the pump and energizing the motor when a pressure proximate the first orifice is equal to a pressure proximate the second orifice, wherein the energized motor moves the piston away from the motor and into a second position for obstructing the fluid flow between the first orifice and the second orifice; and
    moving the piston into a third position for limiting the fluid flow between the first orifice and the second orifice by reducing power to the energized motor, or moving the piston into the first position by turning off the energized motor, when the pressure proximate the second orifice exceeds a predetermined threshold pressure.

11. The method of claim 10, further comprising turning off the pump when the piston is in the second position.

12. The method of claim 11, wherein when the piston is in the second position, the pressure proximate the first orifice approaches 1 bar.

13. The method of claim 10, further comprising measuring the predetermined threshold pressure in the at least one clutch, or outside of the at least one clutch and proximate the second orifice.

14. The method of claim 10, wherein when the motor is off and the piston moves to the first position, pressure proximate the second orifice is reduced as fluid flows from the second orifice to the first orifice in the first position.

15. The method of claim 10, wherein when power in the energized motor is reduced and the piston moves to the third position, fluid flows slowly between the second orifice and the third orifice so that a desired operating pressure of the at least one clutch is not overshot or undershot.

16. The method of claim 10, wherein when the piston is in the third position, pressure proximate the second orifice reduces towards 1 bar.

17. The method of claim 10, wherein said step of moving the piston away from the motor and into the second position further comprises seating the piston in a ball-to-cone engagement with the housing.

18. The method of claim 17, wherein said step of moving the piston away from the motor and into the second position further comprises covering the second orifice such that no fluid flow occurs through the second orifice.

19. The method of claim 10, wherein said step of moving the piston away from the motor and into the second position further comprises covering the first orifice such that no fluid flow occurs through the first orifice.

20. The method of claim 10, wherein said step of moving the piston away from the motor and into the second position further comprises unsealing the third orifice such that fluid flow occurs through the third orifice.

\* \* \* \* \*